No. 648,828. Patented May 1, 1900.
W. M. BAKER.
HARROW TOOTH AND CLAMP THEREFOR.
(Application filed Feb. 7, 1900.)
(No Model.)
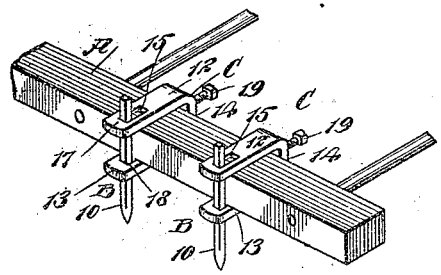
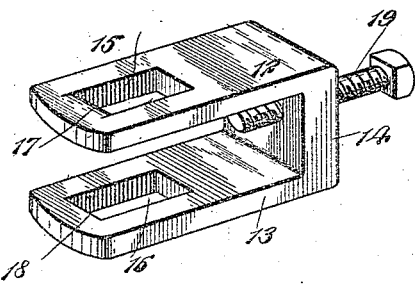
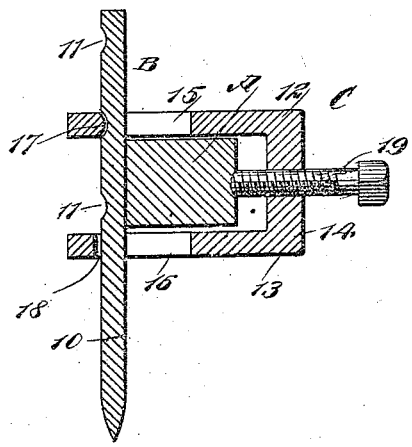
WITNESSES:
INVENTOR
William M Baker
BY
ATTORNEYS

UNITED STATES PATENT OFFICE.

WILLIAM M. BAKER, OF FORTVILLE, INDIANA, ASSIGNOR OF ONE-HALF TO CORYDON M. RICH AND JAMES G. THOMAS, OF MUNCIE, INDIANA.

HARROW-TOOTH AND CLAMP THEREFOR.

SPECIFICATION forming part of Letters Patent No. 648,828, dated May 1, 1900.

Application filed February 7, 1900. Serial No. 4,362. (No model.)

*To all whom it may concern:*

Be it known that I, WILLIAM M. BAKER, a citizen of the United States, residing at Fortville, in the county of Hancock and State of Indiana, have invented new and Improved Harrow-Teeth and Clamps Therefor, of which the following is a full, clear, and exact description.

The purpose of the invention is to provide a simple means whereby teeth may be adjustably and securely fastened to the frame of a harrow, and to so construct the teeth and their clamping devices that they will not only be simple, but durable and economic, and may be quickly and conveniently applied by any one capable of directing a harrow.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a perspective view of a portion of a harrow-frame, illustrating the improved teeth applied thereto. Fig. 2 is a perspective view of a clamp used in connection with the teeth; and Fig. 3 is a vertical section through a beam of the harrow-frame and a tooth and a clamp, illustrating the tooth as held in position on said beam by the said clamp.

A represents a beam of a harrow-frame, which is usually rectangular in cross-section. B represents a harrow-tooth, and C a clamp by means of which the tooth is adjustably secured to the said beam A.

The harrow-tooth B is provided with a plain or flat rear face 10, adapted to engage with the forward surface of the beam A of the harrow-frame, and in the front longitudinal surface of each harrow-tooth B a series of recesses 11 is produced, the said recesses being preferably of semicircular form. In connection with each harrow-tooth B a clamp C is employed, and each clamp consists of an upper member 12, a lower member 13, and a rear connecting member 14. A longitudinal slot 15 is made in the upper member 12 of a clamp, and another slot 16 is made in the lower member 13, the two slots 15 and 16 being practically one beneath the other; but the forward wall 17 of the upper slot 15 in the clamp extends farther inward than the corresponding wall 18 of the slot in the lower member 13, and the forward wall of the upper slot 15 is either beveled or rounded, or is so shaped that it will fit neatly into any one of the recesses 11 in the forward face of the tooth B. The object of arranging the slots 15 and 16 as described is to insure the forward wall 17 of the upper slot 15 of the clamp being in binding engagement with a recessed portion of a tooth when the plain forward surface of the tooth is in engagement with the forward wall 18 of the slot 16 of the clamp, as shown in Fig. 3. The teeth B are held firmly in place by passing set-screws 19 through the connecting members 14 of the clamps to a bearing against the rear of the beams A, as is also shown in Fig. 3.

Having thus described my invention, I claim as new and desire to secure by Letters Patent—

In a harrow, a support, a tooth having its inner longitudinal face in engagement with the said support, its opposite longitudinal face having recesses, a clamp arranged to receive and support the tooth, and comprising upper and lower horizontal members and a connecting member, the upper and lower members having longitudinal slots to receive the shank of a tooth, the forward wall of the slot in the upper member being further inward than the corresponding wall of the slot in the lower member and adapted to enter a recess in the tooth, the corresponding wall of the slot in the lower member being adapted to engage the plain surface of the shank, and means for tightening the clamp to force the forward wall of the slot in the upper member of said clamp against the inner wall of a recess in the tooth.

In testimony whereof I have signed my name to this specification in the presence of two subscribing witnesses.

WILLIAM M. BAKER.

Witnesses:
FRANK W. BREWSTER,
ARDEN H. THOMAS.